(12) United States Patent
Williams et al.

(10) Patent No.: US 10,877,282 B1
(45) Date of Patent: Dec. 29, 2020

(54) HEAD UP DISPLAY SYSTEM FOR UNDERWATER FACE PLATE

(71) Applicant: United States of America as represented by the Secretary of the Navy, Arlington, VA (US)

(72) Inventors: Allie Williams, Panama City Beach, FL (US); Richard Manley, Panama City Beach, FL (US); Brian Wentworth, Panama City, FL (US); Dennis Gallagher, Lynn Haven, FL (US); William Hughes, Lynn Haven, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 18 days.

(21) Appl. No.: 16/456,813

(22) Filed: Jun. 28, 2019

(51) Int. Cl.
*G02B 27/01* (2006.01)
*B63C 11/12* (2006.01)

(52) U.S. Cl.
CPC .......... *G02B 27/0176* (2013.01); *B63C 11/12* (2013.01); *G02B 27/0172* (2013.01); *B63C 2011/121* (2013.01); *G02B 2027/0132* (2013.01)

(58) Field of Classification Search
CPC ........ G02B 2027/0132; G02B 27/0172; G02B 27/017; B63C 2011/121; B63C 11/12; G06F 3/012; G06F 3/011
See application file for complete search history.

(56) References Cited

U.S. PATENT DOCUMENTS

2016/0209648 A1* 7/2016 Haddick ............. G06F 3/03547
2017/0285348 A1* 10/2017 Ayres ................... G02B 6/0016

* cited by examiner

*Primary Examiner* — Abbas I Abdulselam
(74) *Attorney, Agent, or Firm* — James T. Shepherd

(57) ABSTRACT

A head up display system includes first and second optical waveguides. A bracket holds the optical waveguides in a spaced-apart fixed relationship to one another such that their optical axes are separated by a distance of 63.5-65 millimeters. The optical waveguides are angularly disposed with respect to one another to produce a binocular image whose focal plane is located out at a distance of 2-4 meters. The bracket also specifically positions the optical waveguides adjacent to a transparent face plate of a dive helmet or dive mask.

13 Claims, 2 Drawing Sheets

HEAD UP DISPLAY SYSTEM FOR UNDERWATER FACE PLATE

ORIGIN OF THE INVENTION

The invention described herein may be manufactured and used by or for the Government of the United States of America for Governmental purposes without payment of any royalties.

FIELD OF THE INVENTION

The invention relates generally to head up displays, and more particularly to a head up display system disposed within an underwater dive helmet or dive mask.

BACKGROUND OF THE INVENTION

By their very nature, underwater dive missions are difficult and inherently dangerous. Furthermore, the complexity of underwater missions can make it difficult or impossible for a diver to retain all pre-mission briefing information. For these reasons, it is critical for underwater divers to have access to environmental data and mission data while in the water. However, in low visibility water environments, divers can rarely see handheld displays or gauges. Accordingly, divers are generally supplied with audio-communicated information from a topside location. The topside-supplied information can include descriptions of sonar images, blueprints, maps, pictures, etc. Unfortunately, it can be very difficult and confusing for a diver to interpret a topside personnel's audio description of the topside personnel's visual interpretation. Combining this with unreliable audio communication can lead to mission failures or disasters.

SUMMARY OF THE INVENTION

Accordingly, it is an object of the present invention to provide an underwater diver with real-time visual information available to topside personnel.

Another object of the present invention is to provide real-time visual information to an underwater diver for viewing in water environments irrespective of water visibility levels.

Other objects and advantages of the present invention will become more obvious hereinafter in the specification and drawings.

In accordance with the present invention, a head up display system includes first and second optical waveguides. The first optical waveguide has a first optical axis and the second optical waveguide has a second optical axis. A bracket holds the first optical waveguide and second optical waveguide in a spaced-apart fixed relationship to one another such that the first optical axis and second optical axis are separated by a distance of 63.5-65 millimeters. The first optical waveguide and second optical waveguide are angularly disposed with respect to one another to produce a binocular image whose focal plane is located at a distance of 2-4 meters from the first optical waveguide and second optical waveguide. The bracket also positions the first optical waveguide and second optical waveguide within an underwater dive helmet or dive mask having a transparent face plate. More specifically, the bracket positions the first optical waveguide and second optical waveguide 29-31 millimeters from the transparent face plate, and positions the first optical axis and second optical axis 49-52 millimeters below a top of the transparent face plate.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
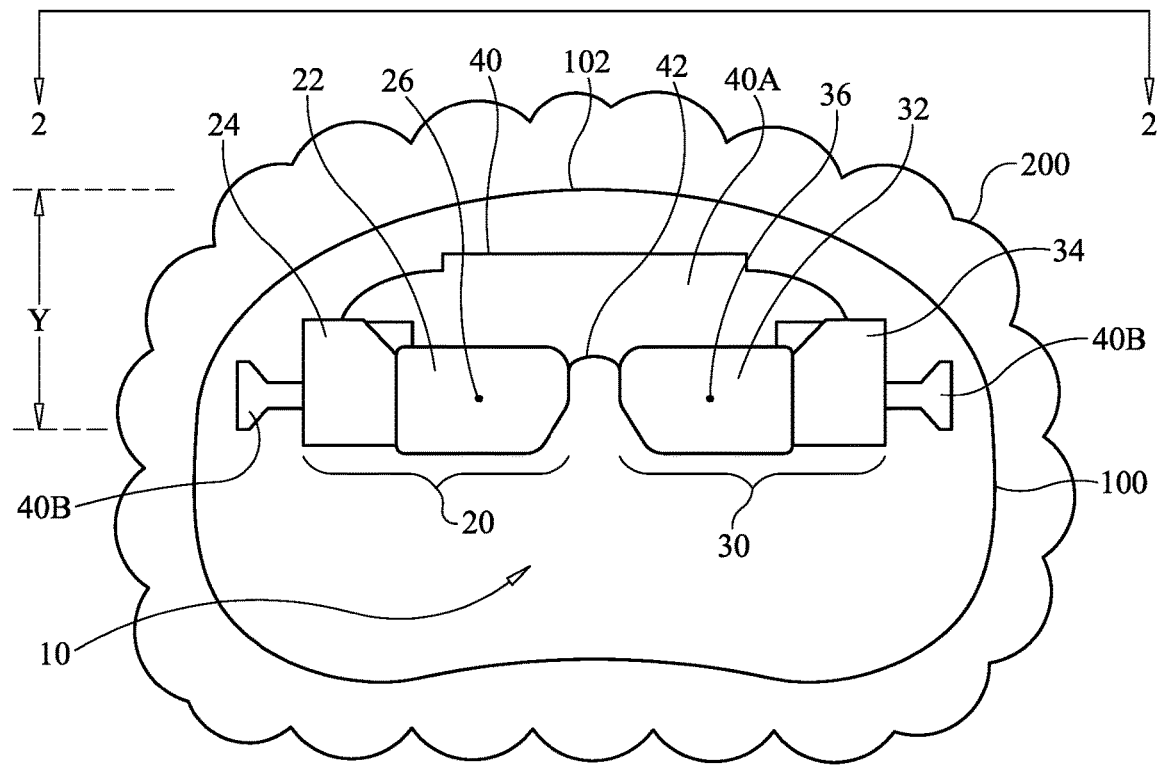
FIG. 1 is a schematic plan view of a head up display system coupled to a transparent face plate of an underwater dive helmet or dive mask in accordance with in embodiment of the present invention.
Figure 2:
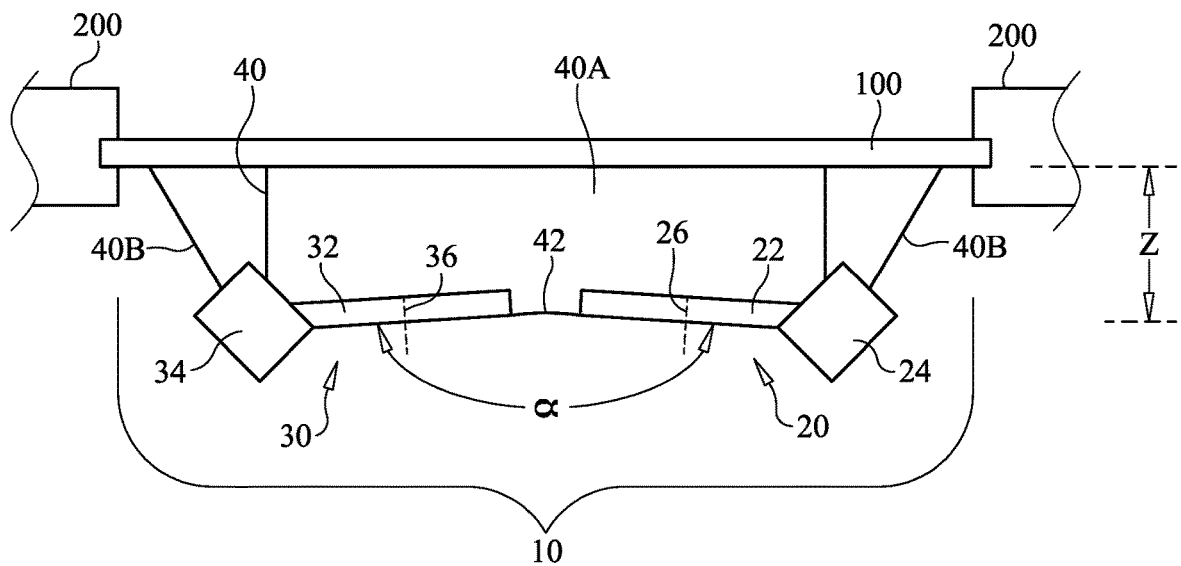
FIG. 2 is a schematic top view of the head up display system's position relative to the transparent face plate taken along line 2-2 in FIG. 1.

Referring now to the drawings and more particularly to FIGS. 1-2, a head up display (HUD) system in accordance with an embodiment of the present invention is shown and is referenced generally by numeral 10. HUD system 10 is coupled to a transparent face plate 100 of an underwater dive helmet or dive mask. Transparent face plate 100 defines the view port of an underwater dive helmet or dive mask whose face plate supporting portion is referenced by numeral 200. It is to be understood that the particular choice of dive helmet or dive mask and its transparent face plate are not part of or limitations on HUD system 10. By way of a non-limiting example, a dive helmet that can be equipped with HUD system 10 is the model KM37 dive helmet available from Kirby Morgan Dive Systems, Inc., Santa Maria, Calif.

HUD system 10 is disposed within a dive helmet or dive mask such that a user thereof views face plate 100 through HUD system 10. When activated and supplied with visual data, HUD system 10 provides a user of the dive helmet or dive mask with a binocular image of the visual data overlaid on the scene visible to the user through face plate 100. When not activated, HUD system 10 presents the user with an unobstructed see-through path to and past face plate 100.

In the illustrated embodiment, HUD system 10 supports and positions two optical waveguides in a fixed configuration that requires no adjustments by the user. That is, by simply wearing the dive helmet, the user can take advantage of the above-described activated and non-activated attributes of HUD system 10. Accordingly, HUD system 10 provides a user with seamless transition capability between the HUD system's activated and non-activated states.

HUD system 10 includes first and second (or right and left as viewed by a user) optical engines referenced generally by numerals 20 and 30 respectively. In the illustrated embodiment, optical engines 20 and 30 are identical devices. Each optical engine includes an optical waveguide 22 or 32 and supporting electronics 24 or 34, respectively, coupled thereto. Each supporting electronics package receives remotely-supplied signal/video data (e.g., from a topside location in the case of underwater dive applications) for presentation to the respective optical waveguide. Such optical engines are available commercially from, for example, Lumus, Ness Ziona, Israel. In the illustrated embodiment, each optical waveguide 22 and 32 is a see-through optical waveguide that receives visual data from its side-mounted supporting electronics 24 and 34, respectively.

Optical engines 20 and 30 are fixed relative to one another by a bracket 40 that can be coupled to face plate 100 and/or portions of the dive helmet or dive mask without departing from the scope of the present invention. For example, bracket 40 can include a central portion 40A coupled to an upper central portion of face plate 100, and can include side portions 40B coupled to side regions of face plate 100. Bracket 40 can incorporate a nose bridge 42 disposed between optical waveguides 22 and 32 to insure proper positioning of a user's face/eyes for use of HUD system 10. Nose bridge 42 is configured to allow a user's nose (not shown) to pass thereunder without touching bracket 40 to assure that alignment of waveguides 22 and 32 remains undisturbed during use.

Bracket 40 can be of modular construction and made from multiple materials. Bracket 40 can be made to be attachable and removable from face plate 100 (or the face plate's surrounding structure) without disturbing the waveguides. The portion of bracket 40 that frames the waveguides can be made of a rigid material such as, but not limited to, stainless steel, to facilitate tight tolerances in the positioning of the waveguides. The other portions of bracket 40 can be made from, but not limited to, robust plastic materials.

Figure 3:
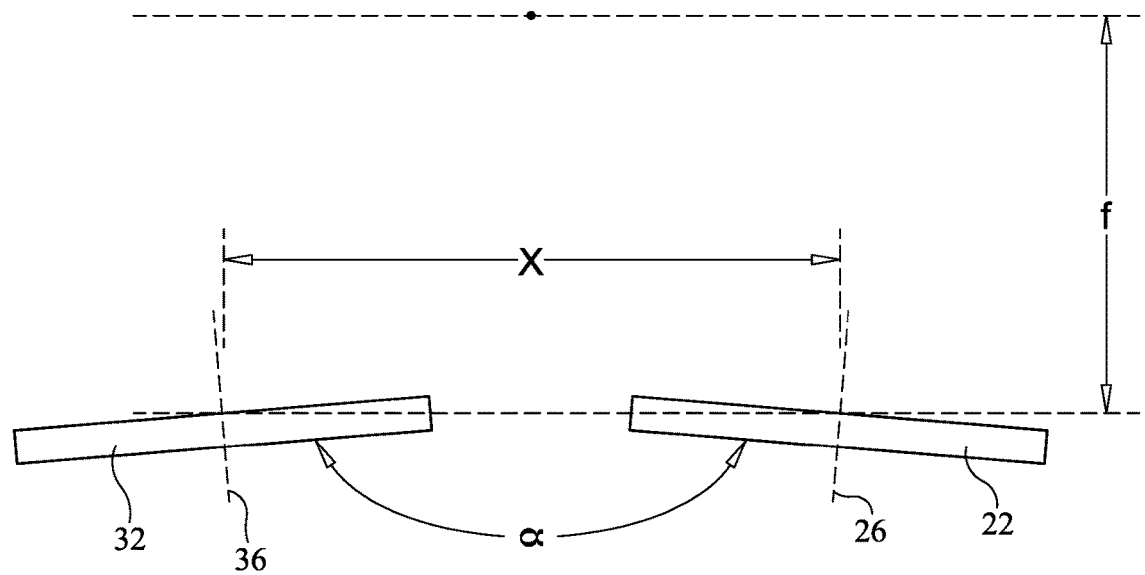
FIG. 3 is an isolated view of the head up display system's optical waveguides illustrating their relative spacing and angular orientation in accordance with the present invention.

Bracket 40 also fixes/positions optical waveguides 22 and 32 adjacent to face plate 100 in order to support operation of HUD system 10 as will now be explained with additional reference to FIG. 3. Each optical waveguide has a respective optical axis 26 and 36. Bracket 40 supports and fixes optical waveguides 22 and 32 such that the distance "X" between optical axes 26 and 36 where they intersect their respective waveguides is 63.5-65 millimeters. In addition, bracket 40 angularly disposes optical waveguides 22 and 32 relative to one another as defined by an angle "α" that is between 174°-176°. By doing so, a focal plane distance "f" is equal to 2-4 meters as a user views an image through HUD system 10. The focal plane distance of 2-4 meters facilitates the working distance of a diver. That is, divers frequently work in turbid waters with limited range of visibility where most of a diver's visual interest lies within the range of the above-referenced focal plane distance. This focal plane distance also provides an increased ability for users to converge individual images into one binocular image given a fixed focal length and fixed interpapillary distance of the display.

Bracket 40 also establishes the positioning of optical waveguides 22 and 32 relative to face plate 100. More specifically, bracket 40 positions optical waveguides 22 and 32 such that each optical waveguide at its optical axis is spaced apart from face plate 100 by a distance "Z" that is 29-31 millimeters. Further, bracket 40 positions optical waveguides 22 and 32 such that each respective optical axis 26 and 36 is positioned below a top 102 of face plate 100 by a distance "Y" that is 49-52 millimeters. By adhering to these parameters, the waveguides were as close to all user's eyes as possible without limiting the use of the display to those with a shorter eye relief between the face plate and the eye.

Figure 4:
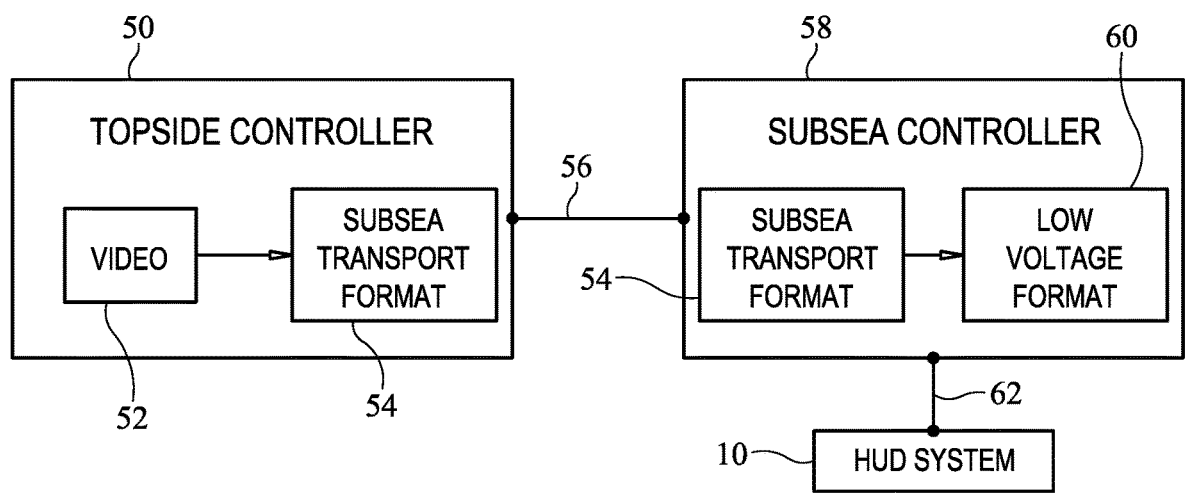
FIG. 4 is a schematic view of a signal handling scheme for use with the head up display system in accordance with an embodiment of the present invention.

As mentioned above, HUD system 10 receives signal/video data from a topside location. FIG. 4 is a schematic illustration of a signal handling scheme for use with HUD system 10. A topside controller 50 (e.g., located on a surface vessel) converts various video data 52 to a subsea transport format 54. For example, subsea transport format 54 can be standard "video over internet protocol" such as "h.264" which is known for its ability to transmit video data via cable (e.g., cable 56) with minimal signal degradation. Data in format 54 is transmitted via cable 56 to a subsea controller 58 located with the user of HUD system 10. The primary function of subsea controller 58 is to convert data in format 54 to a low voltage signal format 60 typically required by the optical engines onboard HUD system 10. Since such low voltage signals are susceptible to signal losses over longer transmission schemes, subsea controller 58 is located with the user of HUD system 10. The low voltage format data is then supplied to HUD system 10 by what will be a short cable 62.

The advantages of the present invention are numerous. A variety of visual data can be provided to a diver in real-time to eliminate the confusion and mistakes associated with a topside-relayed audio or vocal interpretation of visual data. The fixed and specific positioning of the HUD system requires no adjustment or fine tuning. The see-through features of the optical waveguides provide for seamless inclusion or exclusion of visual image data on an "as needed" basis.

There are numerous variations and modifications of the embodiments described herein that will be readily apparent to those skilled in the art. It should be understood that, within the scope of the appended claims, the invention may be practiced other than as specifically described.

What is claimed as new and desired to be secured by Letters Patent of the United States is:

1. A head up display system, comprising:
a first optical waveguide having a first optical axis;
a second optical waveguide having a second optical axis; and
a bracket for holding said first optical waveguide and said second optical waveguide in a spaced-apart fixed relationship to one another, wherein said first optical axis and said second optical axis are separated by a distance of 63.5-65 millimeters at said waveguides, said first optical waveguide and said second optical waveguide being angularly disposed with respect to one another to produce a binocular image whose focal plane is located at a distance of 2-4 meters from said first optical waveguide and said second optical waveguide, said bracket adapted to position said first optical waveguide and said second optical waveguide adjacent to a transparent face plate, said bracket adapted to position said first optical waveguide and said second optical waveguide 29-31 millimeters from the transparent face plate, and said bracket adapted to position said first optical axis and said second optical axis 49-52 millimeters below a top of the transparent face plate.

2. A head up display system as in claim 1, wherein said first optical waveguide is identical to said second optical waveguide.

3. A head up display system as in claim 1, wherein said bracket includes a nose bridge disposed between said first optical waveguide and said second optical waveguide.

4. A head up display as in claim 1, wherein said first optical waveguide and said second optical waveguide comprise see-through optical waveguides.

5. A head up display as in claim 1, wherein an angle by which said first optical waveguide and said second optical waveguide are angularly disposed with respect to one another is 174°-176°.

6. A head up display system, comprising:
 a first optical waveguide having a first optical axis;
 a second optical waveguide having a second optical axis; and
 a bracket for holding said first optical waveguide and said second optical waveguide in a spaced-apart fixed relationship to one another, wherein said first optical axis and said second optical axis are separated by a distance of 63.5-65 millimeters at said waveguides, said first optical waveguide and said second optical waveguide being angularly disposed with respect to one another by an angle of 174°-176°, said bracket adapted to position said first optical waveguide and said second optical waveguide adjacent to a transparent face plate, said bracket adapted to position said first optical waveguide and said second optical waveguide 29-31 millimeters from the transparent face plate, and said bracket adapted to position said first optical axis and said second optical axis 49-52 millimeters below a top of the transparent face plate.

7. A head up display system as in claim 6, wherein said first optical waveguide is identical to said second optical waveguide.

8. A head up display system as in claim 6, wherein said bracket includes a nose bridge disposed between said first optical waveguide and said second optical waveguide.

9. A head up display as in claim 6, wherein said first optical waveguide and said second optical waveguide comprise see-through optical waveguides.

10. A head up display system, comprising:
 a first optical engine that includes a first see-through optical waveguide having a first optical axis;
 a second optical engine that includes a second see-through optical waveguide having a second optical axis; and
 a bracket for holding said first optical engine and said second optical engine in a spaced-apart fixed relationship to one another, wherein said first optical axis and said second optical axis are separated by a distance of 63.5-65 millimeters at said waveguides and wherein said first see-through optical waveguide and said second see-through optical waveguide produce a binocular image at a focal plane distance of 2-4 meters, said bracket adapted to position said first optical engine and said second optical engine adjacent to a transparent face plate, said bracket adapted to position said first see-through optical waveguide and said second see-through optical waveguide 29-31 millimeters from the transparent face plate, and said bracket adapted to position said first optical axis and said second optical axis 49-52 millimeters below a top of the transparent face plate.

11. A head up display system as in claim 10, wherein said first optical engine is identical to said second optical engine.

12. A head up display system as in claim 10, wherein said bracket includes a nose bridge disposed between said first see-through optical waveguide and said second see-through optical waveguide.

13. A head up display as in claim 10, wherein said first see-through optical waveguide and said second see-through optical waveguide are angularly disposed with respect to one another by an angle of 174°-176°.

\* \* \* \* \*